July 24, 1956 H. WURZEL 2,755,698
RETAINING RING HAVING SHAFT ENGAGING PROJECTIONS
TO PREVENT INADVERTENT WITHDRAWAL
Filed Nov. 4, 1952 2 Sheets-Sheet 1

INVENTOR
HUGO WURZEL,
BY
ATTORNEY

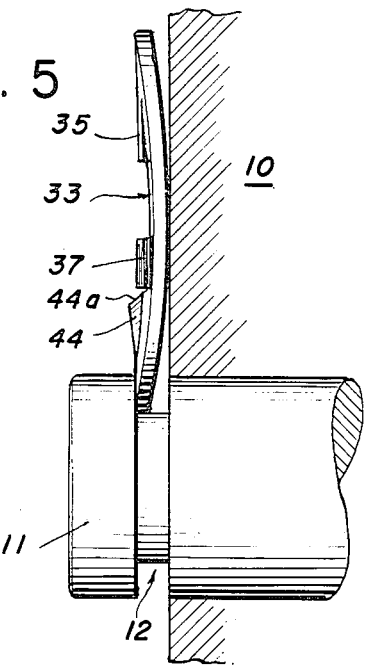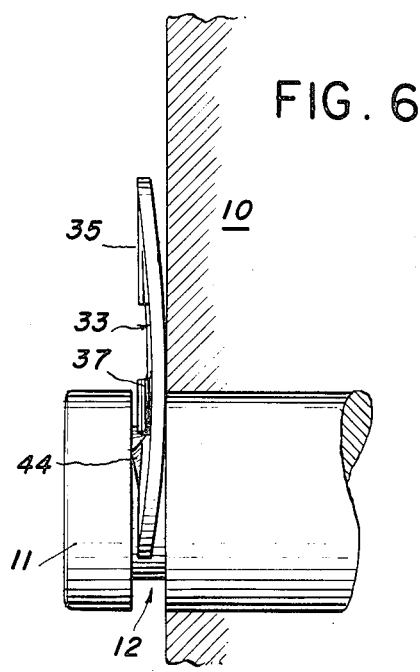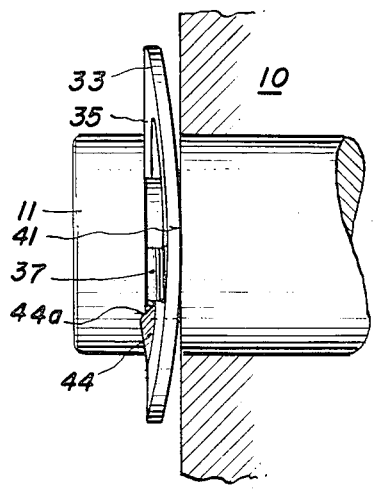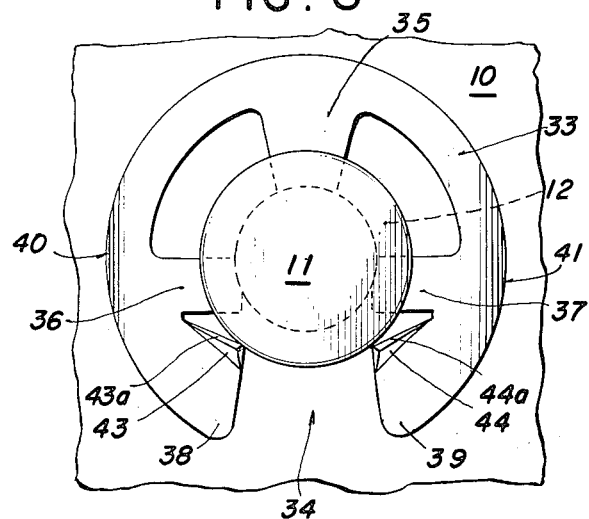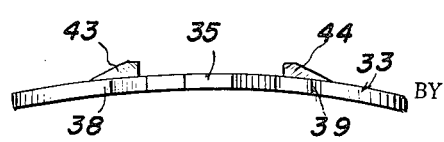

United States Patent Office 2,755,698
Patented July 24, 1956

2,755,698

RETAINING RING HAVING SHAFT ENGAGING PROJECTIONS TO PREVENT INADVERTENT WITHDRAWAL

Hugo Wurzel, Bronx, N. Y., assignor to Waldes Kohinoor, Inc., Long Island City, N. Y., a corporation of New York Application November 4, 1952, Serial No. 318,689

5 Claims. (Cl. 85—8.8)

This invention relates to improvements in retaining rings of the type adapted, when seated in a groove provided therefor in a shaft or the like, to form an artificial shoulder functioning to prevent axial displacement of a machine part mounted on the shaft, and is more particularly directed to an improved external ring of the so-called "open" type.

As is well known, an open retaining ring is adapted to be assembled by placing it over the shaft in the plane of its seating groove and thereupon spreading it over the shaft by shifting it transversely thereof to a position in which it embraces the bottom of the groove along its inner circumference or parts thereof. Disassembly of the open ring is effected by simple withdrawal of the ring from its groove, again in a direction transversely of the shaft. To provide for such assembly and disassembly operations, the open ring must be provided with a relatively large gap between its free ends, and accordingly the open ring is characterized by a gap of width less than but substantially equaling the diameter of the bottom of the shaft groove. Since the arcuate length of the inner edge of such a ring is relatively short, by virtue of the aforesaid large gap necessary between its ends, the open ring must be designed so that when seated its inner edge abuts the groove bottom with the requisite spring pressure enabling it to attach itself to the shaft during rotation of the latter.

However, there are certain open ring assemblies which are so constituted as to engender or to be subject to impact or shock forces which are transmitted edgewise to the ring, and it is a main object of this invention to prevent the ring from accidentally jumping or being driven from its groove when used in such assemblies.

A more particular object of the invention is to provide an open retaining ring which is so constructed and arranged as upon assembly in its shaft groove to effectively lock itself to the shaft with a holding power enabling it to resist jumping or being driven from its groove by impact or shock forces applied against its edge.

Yet another object of the invention is the provision of an open retaining ring which is so constructed as to permit its assembly and disassembly in the usual manner and which, when assembled, seats with spring pressure against the groove bottom as with the prior open rings, but which is further characterized by locking projections having radially innermost portions which are spaced axially from the plane of the ring a distance as to project substantially beyond the outer wall of the groove, i. e. the wall removed from the machine part which abuts the ring, and which are so located radially that upon seating of the ring they bear against the peripheral surface of the shaft beyond the groove, thereby to automatically lock the ring to the shaft in manner as practically to prevent the ring being accidentally shifted or forced out of its groove.

A more specific object of the invention is the provision of an open retaining ring of the so-called "bowed" type, provided in its end portions with locking projections adapted upon assembly of the ring in its shaft groove to effectively lock the ring to the shaft.

Other objects and features of advantage of an open retaining ring according to the invention will appear from the following detailed description thereof, reference being had to the accompanying drawing illustrating preferred physical embodiments of such a ring, in which Fig. 1 is a section taken through the shaft and machine part of a retaining ring assembly, which also illustrates in side elevation one form of improved open retaining ring prior to its being assembled in the shaft groove;

Figs. 5–8 are views corresponding to Figs. 1–4, respectively, which illustrate another form of improved open retaining ring of this invention; and Fig. 9 is an edge view of the open ring shown in the Fig. 8 assembly, looking into the gap side thereof.

Figure 1:
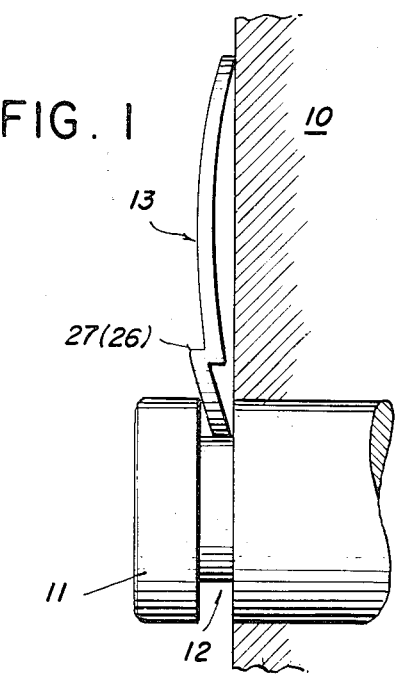
Figure 2:
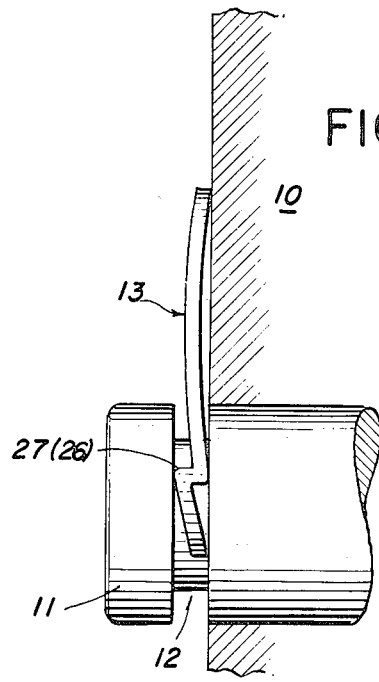
Figs. 2 and 3 are views similar to Fig. 1, illustrating the retaining ring during and following its assembly in the shaft groove.
Figure 3:
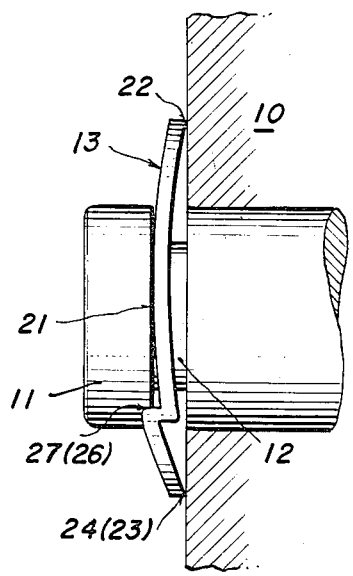
Figure 4:
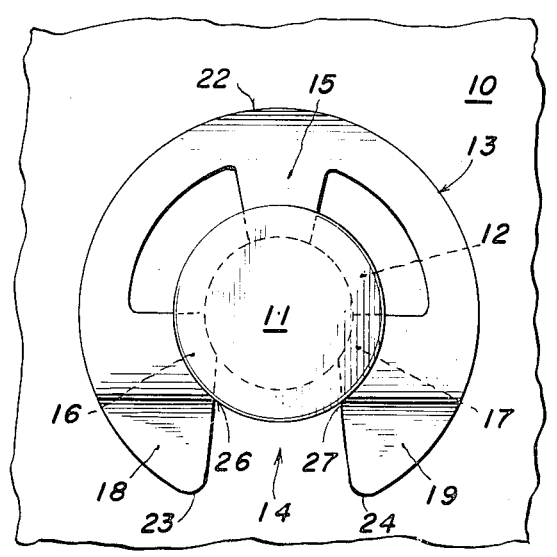
Fig. 4 is a front elevation of the retaining ring assembly illustrated in Fig. 3, the view also depicting the improved retaining ring in front elevation.

In the drawing (Figs. 1–4), reference numeral 10 designates a typical machine part mounted on and adapted to be secured against axial displacement relative to a shaft 11 which is provided with the usual ring groove 12, by means of a retaining ring 13 upon the latter being seated in said groove, as illustrated in Figs. 3 and 4. The ring 13 as best seen in Fig. 4 is of the "open" type which, as is well known, is characterized by an effective inner edge of arcuate length which slightly exceeds 180° and by a gap between its open ends of width less than but substantially equaling the width of the shaft-groove bottom, which latter enables the ring to be spread over shaft in the plane of the groove and assembled (and disassembled) by shifting it transversely to the center line of the shaft 11. The illustrated open ring is of the so-called "E" type disclosed by United States Patent No. 2,487,803, dated November 15, 1949, being characterized by a middle protrusion 15 and end protrusions 16 and 17, the inner arcuate edges of which lie on a circle of diameter somewhat smaller than the diameter of the bottom of the groove 12, whereby said edges abut against the groove bottom with the requisite spring pressure enabling the ring normally to attach itself to the shaft. Preferably, in such a ring, the outer circumference extends throughout a substantially greater arc than does its inner circumference, as required to provide the gap 14 with substantially parallel side edges, such construction resulting in the free or open ends of the ring extending as points 18, 19. As also seen in Figs. 1, 2 and 3, the illustrated ring is of the bowed type, that is to say, it is bowed about its transverse center line, the degree of bowing being greater than the width of the groove 12. Thus, the ring is flattened out during assembly in its groove and, after assembly, abuts the outer wall of the shaft along a line of contact 21 coinciding substantially with its transverse center line and abuts the machine part 10 at a point 22 on the outer periphery of its middle portion and at the points 23, 24 which are the apices of the pointed free ends 18, 19 of the ring. It is to be understood, however, that the invention is not limited to the particular open-type retaining ring shown, since it is applicable also to the bowed open retaining ring characterized by a continuous inner edge.

According to the invention, the open ring as aforesaid is provided with means enabling it, when seated in its shaft groove 12, to automatically lock itself to the shaft against impact or shock forces applied against its edge as may cause it to jump or be driven from the groove. Illustratively, such locking means are provided by two transversely aligned projections 26, 27 protruding from the plane of the ring body a distance such that, upon seating of the ring, the radially innermost portions of said projections, as formed by the intersections of their adjacent inner ends with the substantially parallel side edges of the ring gap, project axially beyond the outer wall of the groove 12, i. e., the wall removed from the machine part 10. Thus, as best seen in Fig. 4, said projections are disposed symmetrically to the sides of the vertical center line of the ring body and on a radius from the ring center at least equaling the radius of the shaft 11.

Referring to Fig. 1, the aforesaid locking projections 26, 27 may be provided by offsetting the end portions 18, 19 of the ring out of the plane of the ring body in such manner as to form along the edges of the gap upwardly facing, sharply angled steps or shoulders as shown. Illustratively, such offsetting is extended across the width of the ring end portions so that the shoulders extend on a horizontal chord of the ring paralleling its transverse center line. However, it should be understood that the invention is not limited to locking projections formed by offsetting the end portions chordwise of the ring, since for example they may also be provided by small width projections or tongues struck from the material defining the edges of the ring gap 14 at the points designated by the numerals 26, 27 in Fig. 4. Regardless of how formed, the locking projections 26, 27 when the ring is seated in its shaft groove subtend a major arc of the shaft circle which is substantially in excess of 180°, and moreover they have axial dimension such that they protrude well beyond the outer wall of said groove when the ring is seated therein.

In assembly, the ring 13 is positioned with respect to the shaft groove 12 and machine part 10 as indicated in Fig. 1, and is then shifted transversely of the shaft to its final position illustrated in Figs. 3 and 4. During such shifting movement, the locking projections 26, 27 slide through the groove 12, as seen in Fig. 2, such action being facilitated by the ability of the ring to flatten, as results in the reduction of the overall axial dimension of the ring. The flattening of the ring of course creates a strong tendency in the ring to return to its original bowed formation. Accordingly, simultaneously with the inner edge of the ring seating against the groove bottom, the locking projections spring outwardly (or to the left, Fig. 3), so as to lockingly bear against the peripheral surface of the shaft beyond the groove.

The action of the locking projections 26, 27 will best be understood by an analysis of Fig. 4, which shows the ring to be fully seated and the locking projections 26, 27 locked with the shaft as represented by the shaft circle. It will be observed here that since the inner edge of the ring 13 only slightly exceeds a 180° arc, an open ring devoid of the locking projections corresponding to the aforesaid projections 26, 27 can be displaced from its groove by the application of a small amount of spreading force resulting in the inner edges of the ring protrusions 16 and 17 widening to the diameter of the bottom circle of the groove 12. However, when provided with the special locking projections 26, 27 as herein proposed, the ring to jump or be driven from its groove must be spread the substantially greater amount resulting in the distance between the locking projections, or, more accurately, between the radially innermost portions of said projections, at least equaling the external diameter of the shaft. Since the possibility of the occurrence of impacts or shock forces of magnitude to spread the ring this large amount is exceedingly remote, a ring provided with the locking projections of the invention is to all practical purposes self-locking against accidental or unintentional disassembly.

Referring to Figs. 5–9, inclusive, such illustrate a functionally similar E-type ring 33 as described above in connection with Figs. 1–4, being characterized by a middle protrusion 35 and end protrusions 36, 37, from which depend points 38, 39 whose adjacent edges are formed substantially straight and parallel and define a large width gap 34. As in the prior described form of ring, the inner arcuate edges of the middle and end protrusions 35, 36, 37 lie on a circle of diameter somewhat smaller than the diameter of the bottom of the shaft groove 12, so as to seat on said bottom with spring pressure in assembly. However, in the modified ring, the ring body is bowed about its vertical center line, i. e. a diameter extending through the radial center line of the middle protrusion 35 and continuing through the gap 34, as best seen in Figs. 8 and 9. The degree of bowing is such that when the ring is assembled in its shaft groove 12 with its concave face disposed against the machine part 10 to be secured, it flattens out, resulting in the outer faces of the end protrusion 35 and of both middle protrusions 36, 37 abutting with spring pressure against the outer wall of the groove, and in the two spaced points 40, 41 (Fig. 8) on its outer periphery (and which are located on the transverse diameter of the ring) abutting the machine part 10, similarly with spring pressure.

In the modified ring, the locking means are illustratively provided by small triangular projections 43, 44 struck out of the body of the ring points 38, 39 immediately below its middle protrusions 36, 37, and being inclined so as to extend an appreciable distance axially forwardly out of the plane of the ring. Said projections have radially innermost portions or edges 43a, 44a functioning as locking shoulders which are so located axially forwardly of the convex face of the ring and radially from the ring center that, when the ring is fully seated as in Figs. 7 and 8, they snap outwardly to lockingly engage against the outer periphery of the shaft beyond the outer wall of the groove 12, as previously described in connection with the locking projections 26, 27.

The advantage of the modified locking ring illustrated in Figs. 5–9 is that this form of ring is somewhat easier to insert in its groove than the Figs. 1–4 form, due to the ease with which the ring may be flattened simultaneously with insertion of its middle and end protrusions into the shaft groove.

Without further analysis, it will be seen that the invention achieves the objectives stated in the foregoing in that it provides an open retaining ring that is able automatically to lock itself to its shaft when assembled therein against impact and shock forces of magnitude such as would cause the conventional open retaining ring to jump or be driven from its groove. The locking projections of the invention are themselves of simple construction and they may be readily applied to the ring in the manufacture thereof. Hence, in terms of improved performance and simple and inexpensive construction, the open retaining ring of the invention has numerous advantages as compared to prior open rings serving similar function, and it also lends itself to use in applications heretofore requiring the nearly closed retaining ring characterized by a small width of gap between its open ends.

As many changes could be made in carrying out the above construction without departing from the scope of the invention, it is intended that all matter contained in the above description or shown in the accompanying drawings shall be interpreted as illustrative and not in a limiting sense.

I claim:

1. A spring retaining ring of the type adapted when seated in a groove provided in a shaft or the like to form an artificial shoulder for securing a machine part mounted on the shaft against axial displacement, comprising an open-ended arcuate ring body characterized by an inner groove-seating edge extending along an arc of about 180° of a circle having diameter corresponding substantially to that of the bottom of said groove and by a width of gap between its open ends which is substantially equal to said diameter, whereby the ring may be assembled in and disassembled from said groove by simple insertion and withdrawal movement thereof in the plane of the groove, said ring body being bowed about a center line to concavo-convex formation by an amount such that its overall axial dimension exceeds the width of the groove whereby it deforms axially during its assembly in said groove, and locking projections on the convex face of the ring body and being located at points which subtend an arc greater than 180° of a circle having diameter corresponding to that of the shaft circle and which are located along the edges of the gap between the open ends of the ring and inwardly from the intersections of said edges with the outer edge of the ring body, said locking projections having radially innermost portions which are spaced from the center of the ring body a distance substantially equaling the radius of the shaft circle and are also spaced axially from the plane of the ring body a distance such that, when the ring is seated in the groove with its convex face disposed forwardly and hence with said locking projections extending in the direction opposite to the machine part to be secured, said projections extend axially forwardly of the outer wall of the groove and lockingly engage against the peripheral surface of the shaft beyond the groove.

2. A spring retaining ring substantially as set forth in claim 1, wherein the ring body is bowed about its vertical center line.

3. A spring retaining ring substantially as set forth in claim 1, wherein said locking projections are formed by the intersections with the gap edges of angular offsets which extend across the ring end portions on a line which is substantially parallel to the transverse center line of the ring body.

4. A spring retaining ring substantially as set forth in claim 1, wherein the ring is bowed about its vertical center line, and wherein said locking projections are struck from and bent out of the plane of the end portions of the ring body.

5. A spring retaining ring substantially as set forth in claim 1, wherein said ring body is bowed about its vertical center line, and wherein said locking projections comprise small triangular wings struck from and bent out of the plane of the end portions of the ring body.

References Cited in the file of this patent

UNITED STATES PATENTS

| | | |
|---|---|---|
| 2,152,977 | Schindel | Apr. 4, 1939 |
| 2,203,397 | Taylor | June 4, 1940 |
| 2,284,222 | Miller | May 26, 1942 |
| 2,405,476 | Weatherhead | Aug. 6, 1946 |
| 2,411,761 | Stolberg | Nov. 26, 1946 |
| 2,487,803 | Heimann | Nov. 15, 1949 |